INVENTOR
Charles O. Hoover
BY
ATTORNEYS

June 14, 1949.    C. O. HOOVER    2,472,976
METHOD OF SEPARATING SOLIDS FROM LIQUID SUSPENSIONS
Filed Feb. 21, 1945    2 Sheets-Sheet 2

INVENTOR
Charles O. Hoover
BY
ATTORNEYS

Patented June 14, 1949

2,472,976

UNITED STATES PATENT OFFICE 2,472,976

METHOD OF SEPARATING SOLIDS FROM LIQUID SUSPENSIONS

Charles O. Hoover, Houston, Tex., assignor to Air Reduction Company, Incorporated, New York, N. Y., a corporation of New York Application February 21, 1945, Serial No. 579,115

1 Claim. (Cl. 210—42.5)

This invention relates to a method of separating solids from liquid suspensions thereof. The method resembles filtration, although it employs no septum such as is used ordinarily in filters. It depends upon the ability of a relatively dense slurry or suspension of solids in a liquid medium to remove suspended solids from the liquid which is treated.

There are many types of suspensions which are not amenable to filtration by ordinary methods. As an illustration, the separation of suspended particles of clay and the like from hydrocarbon oils often presents difficulties which are practically insurmountable with commercially available filtration equipment. Many other suspensions present similar difficulties.

It is the object of the present invention to afford a simple and effective method of separating suspended solids from liquids rapidly and completely and in an economical manner.

Other objects and advantages of the invention will be apparent as it is better understood by reference to the following specification and the accompanying drawing, in which Fig. 1 is a vertical section through an apparatus suitable for the practice of the invention;

Figure 1:
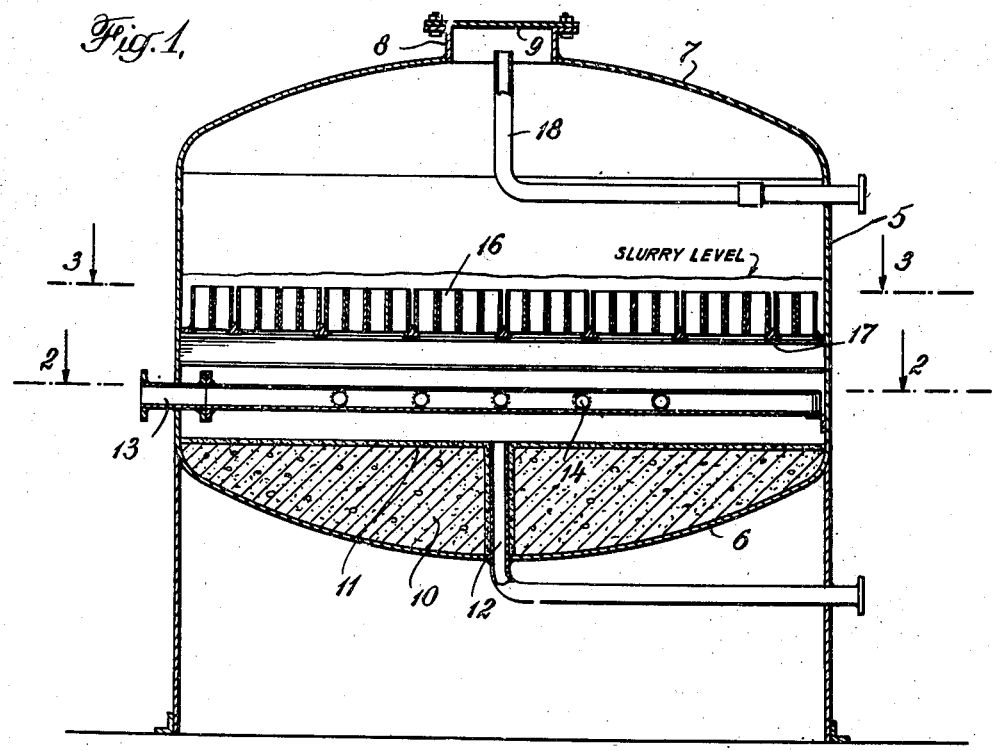
Figure 2:
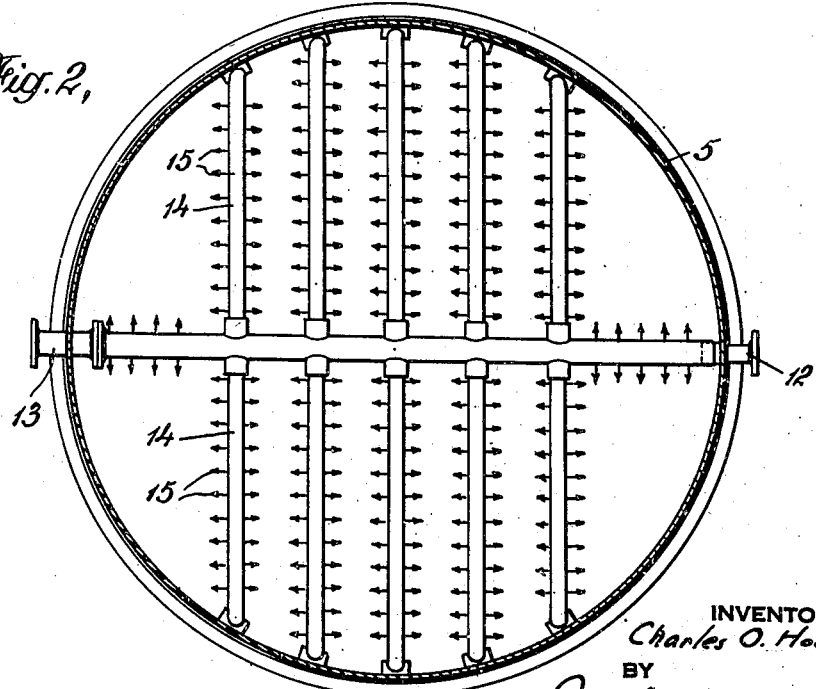
Fig. 2 is a horizontal section on the line 2—2 of Fig. 1.
Figure 3:
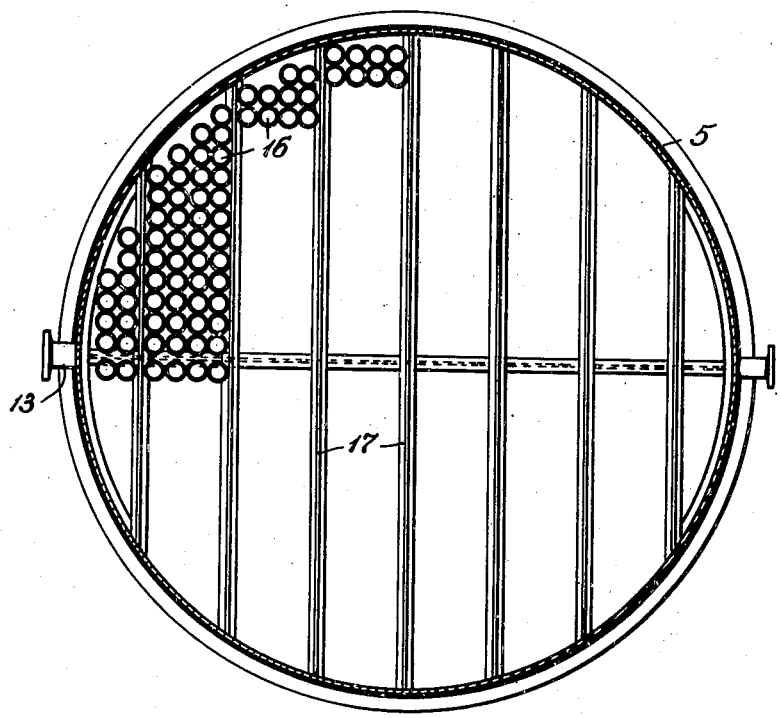
Fig. 3 is a horizontal section on the line 3—3 of Fig. 1.

The invention results from the discovery that a relatively dense suspension of solids in liquid can be maintained in a quiescent zone above a turbulent zone and that suspended particles in a liquid passing from the turbulent zone through the quiescent zone will be retained therein so that a clear liquid effluent may be withdrawn above the quiescent zone. To accomplish the purpose, it is necessary to provide a receptacle into the bottom of which the liquid to be treated may be introduced in a turbulent state and to arrange in the receptacle means for maintaining a quiescent zone in which the slurry is supported and prevented from settling by the turbulent liquid beneath it. An outlet above the quiescent zone permits decantation of the clear effluent liquid which rises from the quiescent zone, the solid particles originally present in the liquid being trapped and held by the slurry in the quiescent zone.

Whenever the input of liquid ceases, the slurry settles to the bottom of the receptacle, and it may be withdrawn for replacement by fresh material or left for further use. Upon resumption of the introduction of liquid, the slurry is first uniformly mixed with the turbulent liquid and then lifted until it is reestablished in the quiescent zone where it remains as a filtering agent during continued operation.

The liquid employed in the slurry should be the same liquid which is being treated, for example a hydrocarbon oil, so that the effluent is not contaminated with extraneous material. The solid portion of the slurry may be any suitable material such as a finely divided diatomaceous earth, clay or the like. The size of the particles will vary with the viscosity and rate of flow of the liquid. Clays commercially available for decolorizing or bleaching oils are suitable. Such clays usually are of a particle size so that 95% will pass a 300 mesh sieve and 100% will pass a 200 mesh sieve.

The proper functioning of the procedure and apparatus depends upon the maintenance of a proper balance between the linear velocity of the liquid and the rate of fall of the solid particles in the slurry which constitutes the filter bed. It depends also upon the concentration of solid particles in the liquid forming the slurry. In a proper slurry the volume of dry solids used should be from 25% to 75% of the volume of oil used. In general a volume of dry solids equal to 50% of the volume of oil will be suitable.

Turbulence below the quiescent zone is also essential. The liquid must be maintained in constant movement throughout to prevent the slurry from settling from the quiescent zone. However, the slurry is not completely static. Some of the particles will fall into the turbulent zone and return therefrom. This does not prevent the maintenance of the function of the slurry in the quiescent zone. Thus, some of the slurry may descend to the turbulent zone, but the upper quiescent layer of slurry prevents solid particles from rising through it with the effluent liquid.

When the linear velocity and rate of flow are properly balanced and the slurry is of proper consistency, the slurry will perform its function of separating solids from the liquid rising through the quiescent zone. Since a wide variety of materials having different characteristics may be treated, it is obviously necessary to determine by experimentation the desirable factors for most efficient operation in each particular case.

Apparatus adapted for the purpose may be varied in form. A practical apparatus for the purpose is illustrated in the drawing, in which 5 indicates a cylindrical receptacle vertically disposed with a bottom 6 and top 7, the latter having a manhole 8 and cover 9 to facilitate access for cleaning and repair. The bottom is preferably filled to the desired level with concrete 10 having a neat cement topping 11 forming the floor of the receptacle. Any other smooth and non-corrodible material may be substituted for the cement. An outlet pipe 12 extends through the floor and bottom of the receptacle to facilitate discharge of the slurry and the introduction of fresh slurry material to the receptacle.

Above the level of the floor of the receptacle, an inlet pipe 13 is connected with a spider consisting of a multiplicity of arms 14 having perforations indicated by the arrows 15 through which the liquid to be treated is introduced and discharged at a velocity which ensures uniform agitation in the turbulent zone. When the apparatus is first placed in operation, the slurry will rest upon the floor of the receptacle and the introduction of the liquid to be treated will agitate it and cause it to rise as the liquid level rises.

The quiescent zone is formed at a level above the arms 14 of the spider by providing a multiplicity of relatively short tubular members 16 supported upon a framework 17 of angle or T irons welded to form a grid. Conveniently the tubular members may be sections of steam boiler tubes cut to the proper length and tacked together by welding. The tubular members 16 afford a multiplicity of conduits of relatively small dimensions and in passing upwardly and into these conduits the turbulence of the liquid rising through them is eliminated, thereby affording the quiescent zone in which the velocity of the rising liquid is balanced against the rate of fall of the solid particles of the slurry. As the liquid rises continuously as it is introduced through the inlet pipe 13, the minute particles of solid material suspended therein are held in the slurry. The liquid rising from the quiescent zone into the upper part of the receptacle is entirely free from such particles and may be withdrawn continuously through an overflow pipe 18 having its open end disposed preferably at the level of the manhole 8.

The size of the equipment and the amount of slurry required will depend, of course, upon the nature of the material which is being treated. The equipment illustrated in the drawing is designed to have a capacity of 250 barrels of oil per hour and for the purpose of treating such oil the apparatus is charged with a slurry composed of 475 pounds of diatomaceous earth and 4593 pounds (18 barrels) of oil. The size of the receptacle is 9 feet in diameter by 8 feet in height, with a volume of 508 cubic feet. The bottom of the frame supporting the tubular members 16 is one foot five inches above the floor of the receptacle. In operation, the slurry upper level is approximately two feet above the floor, and the volume of the receptacle to the slurry upper level approximately 170 cubic feet.

As an example of the operation, a hydrocarbon oil having a specific gravity of 0.7279 was mixed with diatomaceous earth having a specific gravity when dry of 0.3300. When mixed with the oil to form the slurry, the volume of the diatomaceous earth increased approximately 80% and the specific gravity of the wetted diatomaceous earth was 0.773. The free settling rate of the solid particles was 0.065 in./sec. The linear velocity of the oil was 0.079 in./sec. The volume of dry diatomaceous earth was 56 cubic feet, which increased to 159 cubic feet when the earth was wet. The weight of the dry diatomaceous earth was 475 pounds. 113 cubic feet of oil was required for the slurry, or 18 barrels on a 42 gal./barrel basis. Under the conditions outlined, it was possible to separate successfully and satisfactorily all of the finely divided clay in the oil treated.

The foregoing example is, of course, merely an illustration of the application of the invention in the treatment of a particular material in an apparatus of the form and dimensions described. In treating other materials, it would be necessary to effect adjustments in respect to various factors and particularly the linear velocity of the liquid treated in relation to the rate of fall of the solid particles therein. However, the necessary factors can be readily determined in respect to each specific operation, and in such an operation the factors will not change. Hence it is possible to apply the principles to various liquids containing suspended solid particles which must be removed therefrom.

To explain the phenomenon of the separation of solids from liquids by a slurry suspended in the liquid, I have advanced certain theoretical considerations. The invention is not, however, limited to any particular theory. It has been successfully demonstrated that such separation can be effected by the procedure and in apparatus of the type described.

Various changes may be made in the details of the procedure as described without departing from the invention or sacrificing the advantages thereof.

I claim:

The method of separating solid particles from liquids to be treated which comprises establishing a slurry of liquid and finely-divided filtering particles in which the finely-divided particles constitute from 25% to 75% of the volume of the liquid of the slurry, introducing the slurry into a first zone of a separation vessel, introducing liquid containing the solid particles to be separated into said zone with resultant mixing of said liquid and the solid particles carried thereby with the slurry and elevation of at least a part of the slurry to a quiescent zone above said first zone consisting of a plurality of upwardly-extending passages of relatively small cross section where the mixture of liquid to be treated and slurry is maintained in a quiescent state, continuing the introduction of liquids and solid particles to be separated therefrom into said first zone, passing the liquid and solid particles to be separated therefrom upwardly from said first zone into and through the quiescent zone in which the slurry is maintained in a quiescent state, the linear velocity and rate of flow of the liquid containing the solid particles to be separated upwardly through said quiescent zone being so correlated to the density of the slurry therein that solid particles are separated from the rising liquid as the liquid passes upwardly through the slurry in said quiescent zone, and withdrawing the filtered effluent liquid from a zone above the quiescent zone.

CHARLES O. HOOVER.

REFERENCES CITED

The following references are of record in the file of this patent:

UNITED STATES PATENTS

| Number | Name | Date |
|---|---|---|
| 748,308 | Reisert | Dec. 29, 1903 |
| 883,608 | Antoine | Mar. 31, 1908 |
| 1,009,857 | Reisert | Nov. 28, 1911 |

UNITED STATES PATENTS

| Number | Name | Date |
|---|---|---|
| 1,162,624 | Linden | Nov. 30, 1915 |
| 1,661,488 | McGill | Mar. 6, 1928 |
| 1,715,438 | Travers | June 4, 1929 |
| 1,783,466 | Friend | Dec. 2, 1930 |
| 1,903,613 | Dotterweich | Apr. 11, 1933 |
| 2,021,672 | Spaulding | Nov. 19, 1935 |
| 2,214,248 | Hawley | Sept. 10, 1940 |
| 2,245,587 | Hughes | June 17, 1941 |
| 2,259,221 | Darby et al. | Oct. 14, 1941 |
| 2,264,139 | Montgomery et al. | Nov. 25, 1941 |
| 2,272,026 | Spaulding | Feb. 3, 1942 |
| 2,347,318 | Gurney | Apr. 25, 1944 |
| 2,352,772 | Darby | July 4, 1944 |

FOREIGN PATENTS

| Number | Country | Date |
|---|---|---|
| 14,339 | Great Britain | 1908 |
| 2,077 | Great Britain | 1906 |
| 210,774 | Great Britain | May 15, 1924 |
| 57,727 | Germany | Apr. 28, 1889 |
| 23,084 | Netherland | Nov. 15, 1930 |